United States Patent [19]

Iyer

[11] Patent Number: 5,190,993
[45] Date of Patent: Mar. 2, 1993

[54] PROCESS TO ENHANCE THE TENSILE STRENGTH OF RECLAIMED SAND BONDED WITH ESTER CURED ALKALINE PHENOLIC RESIN USING AN AMINOSILANE SOLUTION

[75] Inventor: S. Raja Iyer, Naperville, Ill.

[73] Assignee: Borden, Inc., Columbus, Ohio

[21] Appl. No.: 538,588

[22] Filed: Jun. 15, 1990

Related U.S. Application Data

[63] Continuation of Ser. No. 179,392, Apr. 8, 1988, abandoned.

[51] Int. Cl.$^5$ .......................... B22C 1/22; C08K 9/06; C08J 3/03; C04B 14/04
[52] U.S. Cl. .................................. 523/145; 523/213; 524/188; 106/490
[58] Field of Search ................ 523/145, 213; 524/188; 106/490

[56] References Cited

U.S. PATENT DOCUMENTS

| | | | |
|---|---|---|---|
| 3,008,205 | 1/1967 | Blaies, Jr. | 164/16 |
| 3,234,159 | 2/1967 | Cooper | 523/145 |
| 3,306,864 | 2/1967 | Lang | 523/145 |
| 3,403,721 | 1/1968 | Robins | 164/526 |
| 3,487,043 | 6/1968 | Grudus | 428/378 |
| 3,599,433 | 8/1971 | Murata | 523/132 |
| 3,629,364 | 1/1972 | Soldatos | 525/414 |
| 3,632,844 | 1/1972 | Robins | 523/143 |
| 3,639,658 | 2/1972 | Soldatos | 525/503 |
| 3,642,503 | 2/1972 | Beaney | 106/634 |
| 3,696,622 | 9/1972 | Tohma | 166/295 |
| 3,720,642 | 3/1973 | Junger | 523/145 |
| 3,905,934 | 9/1975 | Gardikes | 525/297 |
| 3,920,460 | 11/1975 | Boston | 106/634 |
| 4,033,910 | 7/1977 | Papa | 521/131 |
| 4,111,253 | 9/1978 | Epstein | 164/526 |
| 4,118,540 | 9/1978 | Amort | 428/447 |
| 4,166,799 | 6/1979 | Biacobbe | 55/89 |
| 4,215,012 | 7/1980 | Kho | 524/442 |
| 4,240,948 | 12/1980 | Huck | 524/296 |
| 4,256,623 | 3/1981 | Sunger | 524/262 |
| 4,283,319 | 8/1981 | Konii | 523/145 |
| 4,426,467 | 1/1984 | Quist | 524/594 |
| 4,468,359 | 8/1984 | Lemon | 523/145 |
| 4,474,904 | 10/1984 | Lemon | 523/146 |
| 4,597,991 | 7/1986 | Graham | 427/214 |
| 4,780,489 | 10/1988 | Dunnavant et al. | 523/145 |
| 4,789,693 | 12/1988 | Jhaveri et al. | 523/145 |

FOREIGN PATENT DOCUMENTS

| | | |
|---|---|---|
| 823269 | 4/1961 | Canada . |
| 27333 | 4/1981 | European Pat. Off. . |
| 0094165 | 11/1983 | European Pat. Off. . |
| 085512 | 3/1985 | European Pat. Off. . |
| 086615 | 3/1985 | European Pat. Off. . |
| 146499 | 6/1985 | European Pat. Off. . |
| 189258 | 7/1986 | European Pat. Off. . |
| 1065605 | 9/1959 | Fed. Rep. of Germany . |
| 1171606 | 12/1964 | Fed. Rep. of Germany . |
| 1242358 | 9/1967 | Fed. Rep. of Germany . |
| 1252853 | 10/1967 | Fed. Rep. of Germany . |
| 1608038 | 1/1968 | Fed. Rep. of Germany . |
| 49-16793 | 2/1974 | Japan . |
| 60-130627 | 10/1975 | Japan . |
| 60-180904 | 6/1985 | Japan . |
| 62-282743 | 12/1987 | Japan . |
| 876033 | 8/1961 | United Kingdom . |
| 882058 | 11/1961 | United Kingdom . |
| 1190644 | 5/1970 | United Kingdom . |
| 1411975 | 10/1975 | United Kingdom . |
| 2050400A | 1/1981 | United Kingdom . |
| 2059972A | 4/1981 | United Kingdom . |
| 2059972B | 4/1981 | United Kingdom . |
| 2154593A | 9/1985 | United Kingdom . |
| 2159163A | 11/1985 | United Kingdom . |
| 2177408A | 1/1987 | United Kingdom . |

OTHER PUBLICATIONS

Union Carbide Bulletin "Union Carbide Silanes as Additives for Foundry Resins" (Apr. 1968) pp. 1-5.
Union Carbide Organofunctional Silane A-1100 Product Info. Publication.
"Silane Coupling Agents as Integral Blends in Resin-Filler Systems" Art.
FOSECO Product Data Sheet.
ECOLOTEC Publication.
FENOTEC Sand Binder System Bulletin.
Betaset Process Introduction.
"The Betaset Process for the Rapid Production of Moulds and Cores", Lemon et al.
Gardiner et al. Publication "Molecular Weight Distribution Measurements of Phenolic Resins".
Ishida Publication, "Molecular Weight of Phenolic Resins".
Tobiason et al. Publication, "Molecular Weight of Phenolic Resins".
Union Carbide Organofunctional Silane A-1106 Product Information Pub.
S.C.R.A.T.A. Article, "Experience of Reclaiming Alphaset Bonded Sand".
"Reclamation of Phenolic Ester Cured Nobake Sands", Iyer et al., AFS Transactions, published Apr. 28, 1988, pp. 611-618.

Primary Examiner—Paul R. Michl
Assistant Examiner—Patrick Niland
Attorney, Agent, or Firm—Venable, Baetjer, Howard & Civiletti

[57] ABSTRACT

The present invention provides methods for treating reclaimed sand obtained from dismantled foundry molds and cores which contain a cured binder derived from an ester cured alkaline phenolic resin. Treatment of the reclaimed sand with a silane solution, particularly an aqueous solution, enhances the tensile strengths of foundry molds and cores produced therefrom beyond those obtained with untreated reclaimed sand. Methods for producing foundry cores and molds which incorporate such a treatment process are also provided by this invention as are raw batch formulations.

34 Claims, No Drawings

PROCESS TO ENHANCE THE TENSILE STRENGTH OF RECLAIMED SAND BONDED WITH ESTER CURED ALKALINE PHENOLIC RESIN USING AN AMINOSILANE SOLUTION

This application is a continuation of Ser. No. 179,392, filed Apr. 8, 1988, now abandoned.

FIELD OF THE INVENTION

This invention relates to the manufacture of foundry molds and cores with alkaline phenolic resin binders and reclaimed sand. More particularly, this invention relates to methods for treating the reclaimed sand so as to improve the tensile strength of articles produced from the reclaimed sand and an alkaline phenolic resin binder.

RELATED APPLICATIONS

This application is closely related to a companion, copending application RIAC-2105, Ser. No. 568,630, filed Aug. 16, 1990, which was a continuation of Ser. No. 179,391, filed Apr. 8, 1988, now U.S. Pat. No. 5,082,876, which is also concerned with the effective reuse of reclaimed foundry sand. That companion application utilizes ester curable alkaline phenolic resins having particular concentrations (i.e. solids contents) as binders for foundry sand comprising reclaimed sand. That application is expressly incorporated herein by reference.

BACKGROUND OF THE INVENTION

In the manufacture of foundry molds and cores from sand which is bonded with a curable binder, recycling the sand is an important economic consideration. Foundry sand can normally be used, then reused, repeatedly, when most resin binders are used. Normally there is a small loss of sand on reuse, and this loss is made up by adding pristine sand to the used sand. These conditions are experienced with most resin binders.

In recent years, however, alkaline phenolic resins have gone into widespread use. These resins can be ester cured at ambient temperature. Such resin binder systems are disclosed, for example, in Patents: U.S. Pat. No. 4,426,467, in which lactones are used as the curing agents; U.S. Pat. No. 4,474,904, in which carboxylic acid esters are so used; and U.S. Pat. No. 4,468,359, in which the esters are in the gaseous or vapor phase. These patents are expressly incorporated herein by reference.

While these binding systems offer many advantages, there are offsetting disadvantages that are sometimes observed. For example when the sand is reused, the tensile strength of the molds or cores drops off. This may have a serious effect on the economics of the foundry.

The extent to which previously used sand is able to be reused is often determined by the tensile properties that can be achieved. One factor which determines the tensile strength is the ability of the binder to bond to the surfaces of the reclaimed sand. Higher rebonding strengths allow higher usage levels of reclaimed sand.

To reclaim sand from a foundry mold or core, the used mold or core is shaken, vibrated or dismantled mechanically subsequent to removal of the casting, to loosen the sand and break up any lumps or agglomerates. The bonding properties of reclaimed sand are generally poorer than those of pristine sand, requiring further processing for effective use. There are three generally recognized treatment methods for reclaiming sand, mechanical, wet and thermal.

The mechanical treatment processes typically involve subjecting the used sand to grinding,, scrubbing or other mechanical attrition to free up the individual grains of sand, remove binder residues, provide clean sand surfaces, and remove fines. The wet treatment processes involve washing the sand with water, draining, and drying the washed sand to the moisture levels necessary for subsequent use. In thermal treatment processes, the sand is heated to a temperature of about 120° C. or above, so that the binder residue is decomposed or burned.

One common objective of these treatment processes is to remove binder residues. The binder residue level may be determined by a loss-on-ignition (L.O.I.) test. New sand has an L.O.I. of about 0.1%, while untreated used sand has an L.O.I. of about 0.5% to 3%.

Where the reclaimed sand is recovered from foundry molds or cores in which the binder was an ester cured alkaline phenolic resin, wet treatment processes have been found to be very effective. Wet treatment processes can produce sand which exhibits high bonding strength substantially equivalent to that of pristine sand. However the thermal and mechanical treatment processes do not produce treated used sand with such high bonding strength. It is believed the wet treatment processes "cleanse" the surfaces of the reclaimed sand of any harmful residues. The mechanical and thermal treatment processes apparently are not as effective in removing these harmful residues.

However, mechanical treatment processes are the most commonly employed by the foundry industry because they are the most economical. Thermal treatment processes are undesirable in comparison because of their high energy costs. Wet treatment processes are undesirable in comparison because of disposal problems associated with the wash water and energy costs for drying the sand.

Because of limitations in the mechanical and thermal treatment processes, reclaimed sands so treated, particularly those recovered from foundry molds or cores wherein the cured binder was an ester cured alkaline phenolic resin, have bonding properties inferior to those of pristine sand. These inferior bonding properties limit the usage level of reclaimed sand in many cases to about 50 weight percent of the total sand when forming foundry cores and molds. Reclaimed sand levels of up to 90 weight percent are needed to achieve the desired economics and minimize disposal costs.

In comparison, the used, reclaimed sand obtained from foundry molds and cores which employ an acid cured binder, such as an acid cured phenolic resin, an acid cured furan resin, or a phenolic-urethane resin, do not suffer significant losses in bonding strength after thermal or mechanical treatment. However, wet treatment processes are generally not effective for such used sand.

Often, the usage levels of mechanically and thermally treated reclaimed sand in the foundry is as high as 80% to 90% by weight of the total sand usage. Theoretically, the usage levels of such reclaimed sand could be as high as 100%; however, there are handling losses and it is usually necessary to replenish the stock of sand with a makeup amount of pristine sand.

It is desirable to enhance the bonding ability of used sand reclaimed from foundry molds and cores made with ester cured alkaline phenolic resins, to the extent that usage levels of such used reclaimed sand as high as 80% to 90% by weight can be achieved.

In U.S. Pat. No. 3,487,043, inorganic filler material for filler may be, to be used as example, fiberglass, titania, ceramic fibers or powders, carbon black, silica, alumina, silica flour, asbestos, clays, and the like. Silane may be applied directly to this filler—reinforcing material, col. 3, lines 55-58. The reinforced or filled resin is used to make pipes, tanks, and other such objects. There is no suggestion of usefulness in the foundry industry.

The treatment of reinforcing inorganic fillers (glass mats) for polymers with a silane solution has been disclosed in U.S. Pat. No. 4,118,540 and UK Patent Specification 882058. In such treatment processes, the filler is immersed in a silane solution, then dried. The silane is believed to improve the affinity or receptivity of the glass mat for the polymer. There is no suggestion of using such a treatment in a foundry application, and the drying step consumes energy.

J. Robins and others have several patents relating to the use of isocyanate binder systems in the foundry industry. In one such patent, U.S. Pat. No. 3,403,721, there is a disclosure of precoating the sand with a silane, col. 4, lines 32-39, but as that patent points out, precoating in this system offers no advantage over adding the silane at some other point.

The addition of silane to resin binder solutions to increase bonding strength is well known. Methods and compositions wherein a silane is added to the resin solution have been disclosed in the two patents just discussed and also in U.S. Pat. Nos. 4,256,623, 4,111,253 and 3,234,259, and UK Patent Specification 876,033.

SUMMARY OF THE INVENTION

It has now been discovered that the ability of reclaimed sand to form bonded articles of satisfactory tensile strength can be enhanced by treatment of the reclaimed sand with a silane solution.: This treatment is generally useful for used sand that has been recovered for reuse and subjected to a mechanical or thermal reclamation treatment. It is also useful, but generally is not needed, for a used sand that has been subjected to a wet reclamation treatment.

The present invention provides a method for treating reclaimed foundry sand for effective use with an ester cured alkaline phenolic resin. In this method, the reclaimed sand is mixed with a silane solution in a quantity sufficient to provide an increase in tensile strength in a resin-bonded shape, such as a foundry mold or core produced from the reclaimed, silane-treated sand, using an ester curable, alkaline phenolic resin.

This invention provides methods for producing resin-bonded sand shapes, such as foundry molds or cores, wherein at least 20% by weight of the sand used is reclaimed sand. In fact, the amount of reclaimed sand preferably is 50%, 60%, 80%, or even 100%, of the sand used. For many foundries, economics dictate that a reclaimed sand level of 60% to 80%, at least, be used.

These methods comprise the steps of mixing a binder solution, a curing agent, and silane-treated reclaimed sand, in a raw batch formulation, forming the desired shape from this formulation, and allowing the binder to cure. The silane solution can be applied to the reclaimed sand either before, after, or simultaneously with the preparation of the raw batch formulation.

Preferred quantities of silane solution for application to reclaimed sand fall within the range from about 0.05% to 1.0% by weight, based on the weight of reclaimed sand, and the preferred concentrations of the silane solution fall within the range of about 5% to 90% by weight, preferably 10% to 50%, based on the weight of the silane solution.

Treatment of reclaimed sand with a silane solution in accordance with this invention has been found to be more efficient than treatment of reclaimed sand with undiluted silane or by the addition of silane or a silane solution to a solution of an alkaline phenolic resin binder.

This invention additionally provides a binder system which can be used in performing the processes of this invention to provide the raw batch formulations. This binder system comprises three separate components, including: (a) an aqueous solution of a phenolic resin that can cure at room temperature with a curing agent having ester functionality, (b) a curing agent for the resin, and (c) a silane solution. These three components can be mixed with the reclaimed sand in any order, following which the binder will cure and harden. The phenolic resin may be an alkaline phenolic resin, in which case a curing agent with ester functionality will initiate curing at ambient temperature.

Alternatively, if the phenolic resin is neutral or acidic, then the curing agent may be, preferably, a mixture or solution having ester functionality and the ability to impart sufficient alkalinity to the resin upon admixture with it to bring about curing conditions. It is also possible to use separate additions of curing agent and of an alkaline source, to such a resin. This binder system can be added to sand, whether the sand is 100% reclaimed or is a mixture of pristine and reclaimed, to provide resin-bonded shapes such as foundry molds and cores with useful tensile strengths.

DETAILED DESCRIPTION OF THE INVENTION

The term "reclaimed sand", as used herein, refers to sand that has been formed into a resin bonded shape with an alkaline resin binder, then recovered for reclamation and reuse, in the form of free-flowing granules. The invention was developed for use with used sand that had been previously bonded with an ester cured alkaline phenolic binder. Such previously bonded sand, when recovered for reclamation, can be used again as is with an ester curable alkaline phenolic resin binder, but the resin-bonded articles thus formed generally are characterized by tensile strengths that are lower than is desirable. This is believed to be caused by the presence, on the used sand grains, of a water removable residue. This residue appears to consist of several different components, but the important one with respect to effect on tensile strength is believed to be an alkali silicate. If the alkaline phenolic resin binder previously used was a potassium phenolic resin, the residue would comprise potassium silicate. Other alkaline silicates are believed to be produced by other alkaline resins.

The surface residue on the recovered used sand would also be expected to include a film or particles of cured resin binder, carbon, partially carbonized resin binder, and dust, as well as any alkaline silicate present. Some of these materials can be removed by water washing, and some by thermal or attrition treatments. Use of the present invention has the advantage of eliminating concerns over the nature of the residue and the cause of poor tensile strengths, since the use of the present invention leads to the production of resin-bonded sand articles that have satisfactory tensiles.

The present invention provides a practical means for using recovered used sand with an ester curable alkaline phenolic resin to form resin-bonded sand shapes having acceptable tensile strengths, despite the presence of such residues. The invention appears deceptively simple when known, but was not easy of development: it involves the application of a silane solution to the recovered, used sand.

For convenient reference hereafter, the recovered used sand, to which the invention is applicable, is referred to as sand recovered from a shape previously bonded with an alkaline binder, or as sand granules having residual alkalinity, or as sand having on its surfaces a water-removable residue. These alternative expressions are used because of uncertainty of the cause of the poor tensiles that are observed with recovered, previously alkaline-resin-bonded sand, although there is no uncertainty about the improvement in tensiles obtained through the use of the present invention.

Recovered used sand may be prepared for use in the practice of the invention by mechanical and thermal reclamation processes, as now known in the art. Such processes can be used to produce reclaimed sand granules of a size corresponding to a screen distribution of 25 to 140 Grain Fineness, as defined in the American Foundrymen's Society's "Mold and Core Test Handbook", pp. 4.2–4.5. The most preferred grain sizes for pristine sand have a screen distribution of about 30 to 80 and the most preferred grain sizes for reclaimed sand follow a similar size pattern and distribution.

The sand commonly employed in the foundry industry includes silica sand, quartz, chromite sand, zircon sand and olivine sand, but many other materials could be used.

The recovered used sand, with which the invention is concerned, is sand that has been previously bonded with a phenolic resin obtained by the reaction of a phenol, including phenol, a cresol, resorcinol, 3,5-xylenol, bisphenol-A, other substituted phenols, and mixtures thereof, with an aldehyde such as, for example, formaldehyde, acetaldehyde, furfuraldehyde, and aldehyde mixtures. Preferred reactants are phenol and formaldehyde utilized in a molar ratio of phenol to formaldehyde in the range of about 1:1 to about 1:3 and more preferably 1:1.5 to 1:2.8.

Suitable alkaline materials used to condense these phenolic resins include sodium hydroxide, potassium hydroxide, lithium hydroxide, and mixtures thereof, with potassium hydroxide being most preferred. A part of the alkaline material may be provided by substituting for a part of the alkali metal hydroxide a divalent metal hydroxide such as, for example, magnesium hydroxide and calcium hydroxide. The alkali:phenol molar ratio for these phenolic resins preferably is in the range from about 0.2:1 to 1.2:1.

The more commonly useful phenolic resins generally are those having a weight average molecular weight preferably greater than 500, more preferably greater than 700 and most preferably within the range of about 1000 to about 2500, as determined by gel permeation chromatography (GPC). In the preferred GPC method, used herein, the resin sample is dissolved in tetrahydrofuran (THF), then neutralized with 1N hydrochloric acid. The salt thus formed is removed by filtration, and the filtered supernatant liquid resin solution is run on a GPC apparatus to determine Mw. The apparatus included a Waters model 6000A pump, a Waters model R401 differential refractive index detector, a Waters model 730 Data Module, PL Gel 30 cm 10μ columns, porosities $10^4$, 500, and 50 Angstrom units, respectively, and a Rheodyne model 70-10 sample loop injector fitted with a 100μl loop and a 0.5 μm in-line filter situated between the injector and the first column.

To determine Mw for an aqueous alkaline resole, the procedure is as follows. Dissolve 1 g resin in 10 ml methanol. Adjust the pH to 7 on a buffered pH meter using 1N hydrochloric acid. Add 10 ml unstabilized THF and continue stirring to ensure all the resin is in solution. Allow any precipitated salt to settle and transfer 500μl of the supernatent liquor to a 5 ml sample vial. Remove the solvent under vacuum for the minimum of time (about 5 mins) and at a temperature of 35° C. Add 1 ml mobile phase and filter.

Primary calibration of the columns is carried out using phenol and the oligomers formed by reaction of 2,4'-dihydroxy diphenyl methane with formaldehyde at a mol. ratio of 1.5:1 with sulphuric acid catalyst and a temperature of 120° C. for 30 mins. This gives individual peaks for up to 8-ring compounds (m.wt. 850). Above this the calibration curve is extrapolated.

Once the columns are calibrated with primary standards, resins may be run and their weight average molecular weights obtained. One of these samples may be chosen as a secondary standard to check the day-to-day tie-up not only of retention times but of calculated molecular weight averages.

A standard resin solution should be injected each time the GPC system is started up and repeated until consistent retention times and molecular weights are obtained. If the calibration is satisfactory then samples may be run. If the results are consistent but vary from those expected, and there are no leaks or trapped air bubbles in the system, then the columns should be recalibrated with primary standards.

The useful aqueous solutions of the phenolic resin binder should have solids contents in the range from about 40% to 75% by weight, and preferably about 50% to 60% by weight. The Brookfield viscosity of such solutions is generally in the range from about 50 to about 750 cps. The Brookfield viscosity of such solutions at a solids content in the range of 53% to 58% by weight, as measured after standing at 135° C. for 3 hours, is generally in the range of about 75 cps to 250 cps, preferably, 100 to 150 cps, using an RVF Model Brookfield viscometer with a No. 1 spindle at 20 r.p.m., at 25° C.

Some of the preferred phenolic resins are the more highly alkaline phenolic resins described in U.S. Pat. Nos. 4,474,904 and 4,468,359. It is noted that for these resins, alkalinity content is expressed in terms of the molar ratio of potassium hydroxide to phenol, and that potassium hydroxide is described as the most preferred alkali. The molar ratios of KOH:phenol for the preferred potassium alkali condensed phenolic resins of this invention fall within the range of about 0.2:1 to about 1.2:1.

The cured binder within the foundry molds or cores from which the used sand is obtained may include a silane originally added to the aqueous solution of alkaline phenolic resin. Certain silanes are commonly added to phenolic resin solutions to improve the tensile strengths of the molds and cores produced therefrom. Amounts as low as 0.05% by weight, based on the weight of the phenolic resin solution, have been found to provide significant improvements in tensile strength. Higher levels of silane give greater improvements in strength up to quantities of about 0.6% by weight, based on the weight of the phenolic resin solution. The use of silane concentrations at higher levels is not preferred because of the added cost. In addition, because the silane typically used is an aminoalkyl silane, which contains nitrogen, use of excess silane may increase the risk of pinhole defects in the casting and for this reason, amounts in excess of 3% by weight, based on the weight of the binder, are not used.

Preferred curing agents include lactones, organic carbonates, carboxylic acid esters, and mixtures thereof. These species exhibit the ester functionality necessary for "ester cure" of the alkaline phenolic resin.

Generally, low molecular weight lactones are suitable, such as gamma-butyrolactone, valerolactone, caprolactone, beta-propiolactone, beta-butyrolactone, beta-isobutyrolactone, beta-isopentylactone, gamma-isopentylactone and delta-pentylactone. Carboxylic acid esters which are suitable include those of short and medium chain length, i.e., about $C_1$ to $C_{10}$, alkyl mono- or polyhydric alcohols with short or medium length, i.e., $C_1$ to $C_{10}$ carboxylic acids. Specific carboxylic acid esters include, but are not limited to, n-butyl acetate, ethylene glycol diacetate, and triacetin (glycerol triacetate), dimethyl glutarate, and dimethyl adipate.

Of the organic carbonates, those which are suitable include, but are not limited to, propylene carbonate, ethylene glycol carbonate, glycerol carbonate, 1,2-butanediol carbonate, 1,3-butanediol carbonate, 1,2-pentanediol carbonate and 1,3-pentanediol carbonate.

The foundry molds or cores from which the used sands are obtained may also have been cured by gassing with low molecular weight carboxylic acid esters, such as $C_1$ to $C_3$ alkyl formates, including methyl formate and ethyl formate. The gassing catalyst is preferably dispersed in a carrier gas as a vapor or an aerosol. This carrier gas must be inert in that it should not react with the alkyl formate curing agent or have an adverse effect on the curing reaction or other property of the product. Suitable examples of carrier gases include air and nitrogen.

The relative volatility of these alkyl formates enables their use as gassing catalysts. This is especially true of methyl formate which is a volatile liquid having a boiling point at atmospheric pressure of about 31.5° C. At ambient temperatures, it is sufficiently volatile that passing carrier gas through the liquid methyl formate gives a concentrated methyl formate vapor. Ethyl and propyl formates are less volatile than the methyl ester, having boiling points in the range of 54° to 82° C. at atmospheric pressure.

The concentration of formate catalysts in the carrier gas is preferably at least 0.2% by volume and most preferably from 30% to 80% by volume. The total amount of alkyl formate used will typically be from about 10% to 110%, preferably from 15% to 35% by weight of the phenolic resin solution. The time required for adequate gassing depends on the size and complexity of the core or mold and on the particular resin used. It can be as short as 0.1 seconds but more usually is in the range of 1 second to 1 minute. These gassing procedures are described more particularly in U.S. Pat. No. 4,468,359.

In further identifying the reclaimed used sand useful in foundry applications of this invention, the foundry mold or core from which the sand is obtained generally has been used in a metal casting process. It is the heat experienced during the metal casting process which is believed to generate the residues that inhibit or limit the tensiles of resin-bonded articles made from the sand upon reuse.

In reclaiming foundry sand, the casting is first removed from the mold or core. Any sand which adheres to the casting is typically disposed of. The mold or core is then shaken or vibrated to remove any loose sand particulates and break up any lumps to provide free flowing sand granules. In some cases, this may be all that is necessary to recover the used sand. If large clumps persist, they may be broken up by kneaders, mixers, lump crushers, and the like.

Where the reclaimed sand is of a desirable particle size, a silane solution is applied in a quantity sufficient to increase the tensile strength of foundry cores and molds or other resin-bonded articles made from such silane-treated sand. Preferred amounts of silane solution fall within the range of about 0.05% to less than about 1% by weight, based on the weight of the reclaimed sand. More preferably, the quantity of silane solution falls within the range of about 0.1% to 0.5% based on the weight of reclaimed sand.

Although undiluted silane, i.e., silane concentrations of about 100% by weight, will provide the improvements in tensile strength desired for the molds and cores obtained from reclaimed used sand, it is preferred to utilize silane more efficiently by diluting the silane in a solvent, to facilitate application of the solution to the sand.

Preferably, the silane solution used has a concentration of silane of at least 1% by weight, based on the total weight of the solution. More preferably, the silane concentration falls within the range of about 5 to 90 weight percent and most preferably about 10 to 50 weight percent, based on the total weight of solution, i.e. solvent and silane solute. These more preferred silane concentrations apply where the preferred quantities used of silane solution are about 0.05% to 1.0% by weight are used, based on sand.

The degree of agitation used in mixing the reclaimed sand and the silane solution is significant in obtaining high tensile strengths for the molds and cores produced. High speed continuous mixers have been found to be very effective. While low speed equipment will provide the necessary agitation and the improved results desired of the present invention, the high speed mixers will provide even better results.

In treating the reclaimed used sand, the silane solution may be added to the sand simultaneously with or subsequent to the addition of the binder solution and the curing agent. Exposure of the silane solution to the surfaces of the reclaimed sand is apparently not inhibited by the presence of a mixture of the resin binder solution and the curing agent.

The silanes which form part of the silane solution are those which are effective in enhancing the tensile strength of foundry cores and molds obtained from reclaimed sand when bonded with a resin binder. Such silanes are well known to the foundry industry.

Suitable silanes include those conforming to the formula $R'Si(OR)_3$, wherein $R'$ is a $C_2$–$C_6$ alkylene group bonded to an amino, epoxy, mercapto, glycidoxy, ureido, hydroxy, hydroxy-$C_1$–$C_6$ alkylamino, amino-$C_1$–$C_6$ alkylamino, $C_2$–$C_6$ alkenyl or $C_2$–$C_6$ alkenyl-carboxy group and the groups R may be the same or different and are selected from $C_1$–$C_6$ alkyl and $C_1$–$C_6$ alkoxy-substituted $C_1$–$C_6$ alkyl groups. Such silanes include: gamma-hydroxypropyl trimethoxysilane, hydroxymethyl diethoxymethylsilane, N-(gamma-aminopropyl)-gamma-aminopropyl trimethoxysilane, N-(beta-aminoethyl)-gamma-aminopropyl trimethoxysilane, gamma-carboxypropyl triethoxysilane, delta-aminobutyl trimethoxysilane, gamma-mercaptopropyl trimethoxysilane, gamma-aminopropyl triethoxysilane, gamma-ureidopropyl triethoxysilane and gamma-glycidoxypropyl triethoxysilane.

Suitable silanes are not limited to those described above. United Kingdom patent specification 876,033 describes suitable silanes that do not conform to the formula above. They include, for example, p-aminophenyl triphenoxysilane, p-hydroxyphenyl trichlorosilane, di-p-hydroxyphenyl diethoxysilane, and p-aminophenylmethyl triethoxysilane.

The most commonly used silanes are the amino silanes. Those amino silanes which are preferred comprise aminoalkyl alkoxysilanes which conform to the general formula $H_2N(CH_2)_nSi(OR^1)_{3-x}(R^2)_x$, wherein n equals a whole number of from 2 to 4, $R^1$ is an alkyl group of from 1 to 4 carbon atoms, $R^2$ is an alkyl group of from 1 to 4 carbon atoms or phenyl and x is 0 or 1. Specific examples of such silanes, which have not been described earlier, include gamma-aminopropyl trimethoxysilane, gamma-aminobutyl triethoxysilane, gamma-aminopentyl triethoxysilane, gamma-aminopropyl diethoxymethylsilane, gamma-aminopropyl diethoxyethylsilane, gamma-aminopropyl diethoxyphenylsilane, delta-aminobutyl diethoxyphenylsilane, delta-aminobutyl diethoxymethylsilane, and delta-aminobutyl diethoxyethylsilane.

Also suitable are diaminosilanes, also referred to as N-(aminoalkyl) aminoalkyl silanes, of the formula, $H_2N—(CH_2)_m—NH—(CH_2)_nSi(OR^1)_{3-x}R^2_x$, wherein n is a whole number of from 2 to 4, m is a whole number of from 2 to 3, $R^1$ is alkyl group of from 1 to 4 carbon atoms, $R^2$ is an alkyl group of from 1 to 4 carbon atoms and x is 0 or 1. Specific examples of such silanes include: N-(gamma-aminopropyl)-gamma-aminopropyl triethoxysilane, N-(gamma-aminopropyl)-gamma-aminopropyl trimethoxysilane, N-(beta-aminoethyl)-gamma-aminopropyl dimethoxymethylsilane.

U.S. Pat. No. 4,256,623 describes suitable alkyl substituted species of the aminoalkyl alkoxy silanes and diaminosilanes. These more particularly include: N-methyl-gamma-aminopropyl triethoxysilane, N-ethyl-gamma-aminopropyl trimethoxysilane, N-methyl-gamma-aminopropyl dimethoxymethylsilane, and N-(N-methyl-beta-aminoethyl) -gamma-aminopropyl dimethoxymethylsilane, and N-(gamma-aminopropyl)-N-methyl-gamma-aminopropyl dimethoxymethylsilane.

Suitable solvents for the silanes may be selected from water-compatible organic solvents, preferably polar organic solvents, aqueous liquids such as water, and mixtures thereof. Aqueous liquids are the preferred solvents in that water is inexpensive and higher tensile strengths are often obtained from silanes dissolved in water. The solvent selected is principally determined by the solubility of the silane. Those silanes which are most preferred are the aminoalkylsilanes available in aqueous solution typically at 40% by weight silane concentration. It is preferable for any organic solvent used to be water soluble so that it is compatible with the binder solution, which is an aqueous solution. Suitable organic solvents include alcohols and glycols of from 1 to 6 carbon atoms such as methanol and ethanol. The alcohols are suitable solvents for the ureidosilanes and glycidoxy silanes described above. Water is the preferred solvent for aminosilanes.

Foundry Molds and Cores

Also provided by this invention are methods for producing foundry molds and cores from a curable binder system and sand, of which at least 20% by weight is used sand that has been reclaimed, generally from dismantled foundry molds or cores which have been used and that were made with an ester cured alkaline phenolic resin.

These methods comprise forming a raw batch formulation comprised of reclaimed sand, a solution of a resin binder, and a curing agent, wherein at least 20%, preferably from 50% to 100%, by weight of the sand is used, reclaimed sand from articles such as foundry molds or cores, which sand has had applied to it a silane solution in sufficient quantity to increase the tensile strength of articles produced from the raw batch formulation.

The silane solution and reclaimed sand are mixed prior to forming the desired shape.

The binder solution used in this raw batch formulation comprises an aqueous solution of a phenolic resin that can cure at room temperature with a curing agent having ester functionality. Most preferably, the phenolic binder is an aqueous solution of an alkaline phenol formaldehyde resin wherein (i) the solids content is in the range from 40% to 75%, (ii) the weight average molecular weight (Mw) is from 500 to 2500, preferably 700 to 2000, and more preferably from 800 to 1700, (iii) the formaldehyde:phenol molar ratio is from 1:1 to 3:1, preferably 1.2:1 to 2.6:1, (iv) the alkali:phenol molar ratio is from 0.2:1 to 1.2:1, preferably 0.6:1 to 1.2:1, (v) the alkali used comprises sodium hydroxide, potassium hydroxide, and their mixtures, (vi) said solution may optionally contain a silane to the extent of 0.05% to 3.0% by weight of said aqueous resin solution, and (vii) said resin is curable at room temperature with $C_1$–$C_3$ alkyl formates, organic esters formed from $C_1$–$C_{10}$ carboxylic acids and mono- and polyhydric alcohols, and low molecular weight lactones including butyrolactone, propiolactone, caprolactone, and mixtures thereof.

However, the phenolic resin may also be an acidic or neutral resin, the aqueous solution of which is made alkaline either before or at the same time that the ester-functional curing agent is added to the resin solution. Otherwise, the parameter values (i) through (iii) and (vi) through (vii) apply, and after addition of the source of alkalinity to the resin, the parameter values (iv) and (v) also apply, for the more preferred embodiments.

The amount of alkaline phenolic resin in the binder solution must be sufficient to provide the necessary adhesive bond between sand particles. Quantities of the resin solution, in the range of about 0.5% to 8% by weight, based on the weight of sand, are preferred and amounts below 2% by weight are most preferred, where the phenolic resin solution is at a solids content of about 40% to 75% by weight and preferably about 50% to 60% by weight. The Brookfield viscosity for these resin solutions ranges from about 50 to 750 cps, at a solids content of about 40% to 75%, and is preferably 75 to 250 cps, at a solids content of 53% to 58%, as measured on a RVF Model Brookfield viscometer, with a No. 1 spindle at 20 r.p.m., at 25° C.

Binder solutions with a solids content below 50% have not been preferred for use with pristine sand. Binder solutions with a solids content above 75% by weight have not been used because the viscosity of such solutions is too high.

The third component of the raw batch formulation is a curing agent for curing the binder. The preferred curing agents are the lactones, organic carbonates, and carboxylic acid esters, or mixtures of such agents.

The methods for producing foundry molds or cores which comprise this invention include those methods wherein the curable binder solution is cured by gassing with an alkyl formate, either directly or with a carrier gas. These methods have been described more particularly above and in U.S. Pat. No. 4,468,359.

The amount of curing agent used should be sufficient to cure said binder under curing conditions, which is generally at ambient temperature and pressure. Where the curing agent is mixed with the sand and the binder solution to provide the raw batch formulation, concentrations of curing agent of from about 10% to 110%, based on the weight of binder solution, are preferred.

An optional ingredient in the curable binder solution, which is often a preferred ingredient, is a silane which is effective in increasing the tensile strength of the foundry mold or core product. Suitable silanes are those described above. The quantity of silane added to the binder solution is that which provides an increase in tensile strength for the article produced. Such quantities generally fall within the range of about 0.05% to 3% by weight, based on the weight of the binder solution.

In addition to forming the raw batch formulation, steps must be taken to form this raw batch formulation in the shape desired, which generally will be a foundry core or mold. This can be accomplished by mixing all the components of the raw batch formulation together and then forming this mixture in the desired shape. Alternatively, sand and a binder solution may be mixed and formed into the desired shape, then gassed with an alkyl formate of from 1 to 3 carbon atoms.

The silane solution may be mixed with the reclaimed sand either prior to, subsequent to or simultaneously with the formation of the raw batch formulation. There is an exception to this when the binder in the shaped raw batch formulation is cured by gassing with an alkyl formate. In that case it is important that the reclaimed sand be mixed with a silane solution prior to forming the raw batch into the desired shape. A suitable amount of silane solution for admixture with reclaimed sand is that which is sufficient to increase the tensile strength of the foundry cores and molds produced, as compared to similar articles prepared from untreated sand. Preferred quantities of silane solution and preferred concentrations of silane solution are as described above.

Preferred reclaimed sand for use in this invention is obtained from used, resin bonded foundry molds or cores which (1) were made with a cured, alkaline phenolic resin binder, (2) have been exposed to a metal casting process and (3) have been dismantled mechanically. The preferred particles for the reclaimed sand have an AFS screen distribution size of 25 to 140 Grain Fineness.

Raw Batch Formulations

The raw batch formulations used in the methods described above comprise sand, of which at least 20% by weight is reclaimed, generally from dismantled foundry molds and cores which have been used in a metal casting process.

The reclaimed sand is mixed with a silane solution in an amount sufficient to increase the tensile strength of molds and cores obtained therefrom, as compared to similar articles made from reclaimed sand that has not been treated with silane solution. Preferred silane solutions are as described above.

The raw batch formulations also include a solution of a resin binder, preferably an alkaline phenol formaldehyde resin which is used in an amount sufficient to bind the sand with the strength necessary for use as foundry molds and cores. Preferred binder solutions and amounts thereof are as described above.

The third component of the raw batch formulation is a curing agent selected from the group consisting of lactones, carboxylic acid esters, organic carbonates, and mixtures of these agents, which cause the binder to cure at ambient temperature and pressure. The curing agent is present in an amount sufficient to cure said binder solution. Preferred curing agent solution concentrations fall within the range of about 10% to 110% of the curing agent by weight, based on the weight of resin solution, which is at a concentration of 40% to 75% or so solids, by weight.

The components of this raw batch formulation are uniformly mixed so as to permit a uniform cure of the binder. This can be achieved with simple lab batch mixers, with high speed, continuous mixers, or with any other type of mixer commonly used for foundry sand.

Binder System

Also provided by this invention is a binder system which can be used for producing foundry molds and cores. This system comprises three separate components. The first component is a solution of an alkaline phenolic resin binder as described previously. Preferred binder solutions are those alkaline phenolic resin solutions identified above.

The second component in the binder system is a curing agent suitable for curing said binder at ambient temperature. Suitable curing agents are selected from lactones, organic carbonates, carboxylic acid esters, and mixtures thereof.

The third component is a silane solution which can either be an aqueous solution, an organic solution or mixtures thereof. The silane applied preferably is a solution that is compatible with the aqueous solution of the binder. Methanol and ethanol are suitable solvents. Suitable silanes are those described in detail above.

To utilize the binder system, amounts of the resin solution and silane solution necessary to provide a foundry core or mold of adequate strength are added to the sand and mixed. A portion of the sand is preferably reclaimed sand. Quantities of binder solution preferably range from about 0.5% to 8% by weight based on the weight of the sand. Preferred quantities of curing agent typically range from 10% to 110% based on the weight of the binder solution at 40% to 75% solids content. The quantity of silane solution utilized is dependent on the proportion of reclaimed sand within the sand utilized and preferably is from 0.05% to 0.5% by weight, based on the weight of reclaimed sand.

The resin and silane components of this binder system can be mixed with sand in any order and should provide superior tensile strengths in the articles produced. Where only small amounts of reclaimed sand is used, i.e., below about 40% by weight of the total sand, it may be desirable to treat the reclaimed sand prior to admixture with the pristine sand so as to economize on the silane solution used.

This invention will be demonstrated by the following examples and in these examples, and elsewhere throughout the specification, parts and percentages are by weight and temperatures are in C unless expressly indicated to be otherwise.

EXAMPLE 1

Pretreatment of Reclaimed Sand With Aqueous Solutions of Gamma-Aminopropyl Triethoxysilane In this example, reclaimed sand was treated with an aqueous solution of gamma-aminopropyl triethoxysilane and used to form test cores. These test cores were compared against test cores obtained from untreated sand.

Test cores were made from reclaimed sand as treated below.

Control 1—The reclaimed sand was not treated.

Test A—The reclaimed sand was treated at 25° C. with 0.024 weight percent, based on the weight of sand, of a 40% solution in water of gamma-aminopropyl triethoxysilane diluted with 0.096 weight percent water, based on the weight of sand.

Test B—The reclaimed sand was treated at 25° C. with 0.048 weight percent, based on the weight of sand, of a 40% solution in water of gamma-aminopropyl triethoxysilane diluted with 0.072 weight percent water, based on the weight of sand.

Test C—The reclaimed sand was treated at 25° C. with 0.12 weight percent, based on the weight of sand, of a 40% gamma-aminopropyl triethoxysilane in water.

The sand used was a mixture of reclaimed sand obtained from foundry cores and molds that had been used in casting molten iron or steel. The cured binder in the molds and cores from which this said was obtained was ALpHASET 9000 potassium alkali phenol-formaldehyde resin binder from Borden, Inc. having a Brookfield viscosity of from 100–150 cps, as determined by a RVF Model Brookfield viscometer with a No. 1 spindle at 20 r.p.m., at 25° C. This resin binder has a solids content of about 54% by weight, a phenol:formaldehyde molar ratio of about 1:1.8 and a KOH:phenol molar ratio of about 0.85:1. This resin binder also contained gamma aminopropyl triethoxy silane in an amount of about 0.4% by weight, based on the weight of the binder solution. This resin was cured with triacetin.

In reclaiming the sand, the used molds and cores were shaken within a vibratory mill (Vibramill of General Kinematics Corp., Barrington, Ill.) to remove loose particulates and break up any lumps. The sand grains were treated mechanically in a Thermal/Mechanical unit (Eirch Machines, Maple, Ontario, Canada) at ambient temperature. The reclaimed sand had a AFS screen distribution of about 39.1 Grain Fineness. The L.O.I. of the reclaimed sand was about 0.450.

In performing the processes of this invention, the reclaimed sand was added to a Hobart Kitchen Aid Mixer, brought to 25° C., and mixed with added silane solution for about 1 minute.

To produce the test cores, from 1500–2500 grams of the sand for each test and control were added to a Hobart Kitchen Aid mixer. This sand was brought to a temperature of about 25° C., the silane solution was applied, and about 1.5% by weight of an aqueous solution of ALpHASET 9000 potassium alkali condensed phenolformaldehyde resin, having a solids content of about 54% by weight, was added to the sand. This resin binder solution had a Brookfield viscosity in the range of 100–150 cps utilizing a Model RVF Brookfield viscometer with a No. 1 spindle at 20 r.p.m. and 25° C. The weight percent of resin was based on the weight of sand. The phenol:formaldehyde molar ratio for the resin was 1:1.8. The KOH:phenol molar ratio for the resin was 0.85:1. The resin binder solution additionally contained the silane gamma-aminopropyl triethoxy silane in an amount of about 0.4% by weight, based on the weight of binder solution.

The resin and sand were mixed for about 1 minute then about 25% by weight of triacetin, based on the weight of the resin solution, was added to the Hobart Kitchen Aid mixer and mixed for about another 40 seconds.

After mixing, the sand was used immediately to form Standard American Foundrymen Society's 1-inch dogbone tensile briquettes in a Dietert 696 corebox. The cores cured at room temperature and were broken at the following time intervals: 1 hour, 2 hours, 4 hours and 24 hours, after the mix was made.

Tensile strength measurements were made using a Dietert Universal Sand Strength Machine 400-1 fitted with a Tensile Core Strength Accessory 610-N.

The tensile strengths of 3–4 cores obtained for each test and control were measured at the intervals indicated above and averaged. The average values are reported in Table 1 with the percent improvement in tensile strength also indicated.

TABLE 1

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-1 | — | — | 23 | 33 | 35 | 35 | — | — | — | — |
| Test A | 0.024 | 0.096 | 42 | 50 | 53 | 53 | 82.6 | 51.5 | 51.4 | 51.4 |
| Test B | 0.048 | 0.072 | 41 | 58 | 63 | 60 | 78.2 | 75.7 | 80.0 | 71.4 |
| Test C | 0.120 | — | 42 | 58 | 68 | 70 | 82.6 | 75.7 | 94.0 | 100.0 |

The data in Table 1 illustrate the progressive improvements in tensile strength that can be achieved by pretreating the sand with a silane solution. The effectiveness and economy in diluting the silane with water is also shown in that the initial tensile strength of cores obtained from Test A and those of Test C are equivalent, wherein Test C utilized five times more silane when compared to Test A. Cores obtained from Test B show equivalent tensile strengths to those of Test C at later intervals, although less silane was utilized.

EXAMPLE 2

Pre-Treatment With Silane Solutions vs. Silane in the Binder

This example compares the tensile strength of test cores obtained utilizing the processes of this invention with test cores obtained where additional silane was added to the binder solution.

Test cores were made from reclaimed sand as treated below.

Control-2—The reclaimed sand was untreated.

Control-3—The reclaimed sand was untreated, but 0.02 weight percent of a 40% solution in water of gamma-aminopropyl triethoxysilane, based on the weight of sand, was added to the binder solution.

Test-D—The reclaimed sand was treated at 25° C. with 0.02 weight percent, based on the weight of sand, of a 40% silane solution as described in Control 3, diluted with 0.18 weight percent water, based on the weight of sand.

In treating these different lots of treated reclaimed sand, the silane solution was directly added to sand at 25° C. in a Hobart Kitchen Aid Mixer and mixed for about 1 minute.

The sand used in this example was reclaimed from foundry molds and cores that had been used in casting molten iron or steel. These molds and cores were made using as the binder an ALpHASET 9000 potassium alkali phenol-formaldehyde resin binder as described in Example 1. These resins were cured with triacetin as the curing agent.

In reclaiming the sand, the used molds and cores were shaken within a vibratory mill as described in Example 1 to remove loose particulates and break up any remaining lumps.

To prepare the test cores, from 1500-2500 gms of sand for each test and control were added to a Hobart Kitchen Aid Mixer. This sand was brought to a temperature of about 25° C., the silane solution was applied, and about 1.5% by weight of an aqueous solution of the resin, based on weight of sand, was added to the sand and mixed for about 1 minute. This resin binder was as described in Example 1 for making the test cores.

Then, 25% by weight of triacetin curing agent, based on the weight of resin solution, was added to the Hobart Kitchen Aid Mixer and mixed for another 40 seconds. After mixing, the sand was used immediately to form Standard American Foundrymen's Society's 1 inch dogbone tensile briquettes on a Dietert 696 corebox.

The cores were cured at room temperature and broken at the following time intervals, 1 hour, 2 hours, 4 hours, and 24 hours after the mix was made. Tensile strength measurements were made using a Dietert Universal Sand Strength Machine 400-1, fitted with a Tensile Core Strength Accessory 610-N. From 3 to 4 tensile strength measurements were determined and averaged for each test and control. The average tensile strength values for Control-2, Control-3, and Test D, are given in Table 2.

TABLE 2

| Test | Total Silane Solution % Based on Sand Wt. | | Tensiles (psi) Hrs: | | | | % Improvement In Tensile Strength Hrs: | | | |
| --- | --- | --- | --- | --- | --- | --- | --- | --- | --- | --- |
| | Silane (wt %) | Water (wt %) | 1 | 2 | 4 | 24 | 1 | 2 | 4 | 24 |
| Control-2 | 0 | 0 | 10 | 12 | 22 | 25 | — | — | — | — |
| Control-3 | 0.02 | — | 15 | 26 | 32 | 30 | 50% | 100% | 95.4% | 20% |
| Test-D | 0.02 | 0.18 | 30 | 37 | 44 | 47 | 200% | 208% | 100% | 88% |

The data in Table 2 show that the addition of extra silane to the resin binder is less effective than using silane solutions to pretreat the reclaimed sand in accordance with the present invention. The improvement in tensile strength for Test D is initially 4 times that obtained in Control-3 and generally shows twice the improvement in tensile strength over a 24-hour period.

EXAMPLE 3

Treatment With Silane Solution vs. Silane Added to the Binder With Different Reclaimed Sands Example 3 serves to provide another comparison of the tensile strength of test cores obtained utilizing the present invention with test cores obtained where additional silane was added to the binder solution.

Test cores were made from reclaimed sand as treated below.

Test E—The reclaimed sand at 25° C. was treated with 0.02 weight percent, based on the weight of sand, of a 40% solution in water of gamma-aminopropyl triethoxysilane diluted with 0.18 weight percent water, based on the weight of sand, by mixing in a Hobart Kitchen Aid Mixer for about 1 minute.

Control-4—The reclaimed sand was untreated.

Control-5—The reclaimed sand was untreated, but 0.02 weight percent, based on the weight of reclaimed sand, of a 40% gamma-aminopropyl triethoxysilane solution in water was added to the binder solution.

The reclaimed sand used in this example was obtained from foundry cores or molds that had been used in casting steel or iron. The sand came from a different foundry than those of Example 2 yet the cured binder in these molds and cores was derived from an ALpHA-SET 9000 potassium alkali phenolic resin as described in Example 1.

This binder was cured using triacetin and contained about 0.4% by weight gamma-aminopropyl triethoxy silane, based on the weight of the binder solution. In reclaiming the sand, the used molds and cores were shaken to remove any loose particles and break up any lumps with a vibratory mill. These sand granules were thermally treated at about 750° C. in an indirectly heated rotary kiln type thermal reclaimer manufactured by Coreco, Inc., Germantown, Wi., to obtain granules having an AFS screen distribution of about 57.1 Grain Fineness.

To prepare the test cores, from 1500-2500 gms of sand were added to a Hobart Kitchen Aid Mixer for each test and control. This sand was brought to a temperature of about 25° C. in the Hobart Kitchen Aid mixer, the silane solution was applied, and about 1.5% by weight of a phenol-formaldehyde resin solution, as described in Example 1, was added and mixed for about 1 minute. The amount of resin solution was based on the weight of sand.

Then about 25% by weight of triacetin as the curing agent, based on the weight of resin solution, was added and mixed for another 40 seconds in the Hobart Kitchen Aid mixer.

After mixing, the sand was used immediately to form Standard American Foundrymen's Society's 1 inch dogbone tensile briquettes in a Dietert 696 corebox. The cores were cured at room temperature and broken at intervals of 1 hour, 2 hours, 4 hours and 24 hours, after the mix was made.

Tensile strengths were measured using a Dietert Universal Sand Strength Machine 400-1, fitted with a Tensile Core Strength Accessory 610-N. From about 3 to 4 tensile strength measurements were made and averaged for each test and control. The average tensile strength values are given for Controls 4 and 5 and Test E in Table 3. The tensile strength of Test D is also reported in Table 3 for comparison purposes.

The reclaimed sand used in this example was as described in Example 3.

To prepare the test cores, from 1500 to 2500 gms of sand were added to a Hobart Kitchen Aid Mixer for each test and control. Following any silane treatment of the reclaimed sand, about 1.5% by weight resin solution, based on the weight of sand, was added to the reclaimed sand in the Hobart Kitchen Aid Mixer and mixed for about one minute. The resin used was as described in Example 1.

Subsequently, about 25% by weight of triacetin, based on the weight of binder solution, was added and mixed for about 40 seconds.

After mixing, the sand was immediately used to form the tensile briquettes as described in Example 1. The cores were cured at room temperature and broken at intervals of 1 hour, 2 hours, 4 hours and 24 hours, after the mix was made. Tensile measurements were made as

TABLE 3

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-4 | — | — | 20 | 28 | 37 | 45 | — | — | — | — |
| Control-5 | 0.02 | — | 37 | 54 | 77 | 90 | 85% | 92.8% | 108% | 100% |
| Test-E | 0.02 | 0.18 | 43 | 61 | 89 | 125 | 115% | 117% | 140% | 177% |

The data in Table 3 show that the use of the silane solution provides superior results over the use of additional silane in the binder solution. It is clear that the tensile strengths for molds made from reclaimed sand are dependent on the treatments applied to such sands when comparing the tensile strengths reported in Table 2 and Table 3.

reported in Example 1. The average values for the tensile strength data for Control 6 and Tests F and G, are given in Table 4.

TABLE 4

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-6 | — | — | 20 | 28 | 37 | 45 | — | — | — | — |
| Test-F | 0.04 | Water 0.16 | 68 | 78 | 108 | 137 | 240% | 178% | 186% | 204% |
| Test-G | 0.04 | Methanol 0.16 | 52 | 53 | 85 | 113 | 160% | 89% | 129% | 151% |

The data in Table 4 demonstrate that superior tensile strengths are obtained with silane solutions in water and in organic solvents.

EXAMPLE 4

Aqueous/Organic Silane Solutions

This example demonstrates the superior tensile strengths of test cores obtained where the reclaimed sand is treated with aqueous/organic solution of silane.

Test cores were made from reclaimed sand as treated below.

Control-6—The reclaimed sand was untreated.

Test-F—The reclaimed sand at 25° C. was treated with 0.04 weight percent, based on the weight of sand, of a 40% gamma aminopropyl triethoxy silane solution in water diluted with 0.16 weight percent water, based on the weight of sand.

Test G—The reclaimed sand at 25° C. was treated with 0.04 weight percent, based on the weight of sand, of a 40% gamma aminopropyl triethoxy silane solution in water diluted with 0.16 weight percent methanol, based on the weight of sand.

In treating the reclaimed sand, the silane solution was directly added to reclaimed sand at 25° C. in a Hobart Kitchen Aid Mixer and mixed for about one minute.

EXAMPLE 5

Aqueous Silane Solutions vs. Water Alone

This example shows that pretreatment of mechanically reclaimed sand with aqueous silane solutions provides improved tensile strengths over the addition of water alone, although the addition of water has been found to improve tensile strengths significantly.

Test cores were made from reclaimed sand as treated below.

Test-H—The reclaimed sand at 25° C. was treated with 0.12 weight percent, based on the weight of sand, of an aqueous silane solution of 40% gamma-aminopropyltriethoxy silane diluted with 0.2 weight percent water , based on the weight of sand.

Control-7—The reclaimed sand was not treated.

Control-8—The reclaimed sand was treated with 0.2% weight percent of water, based on the weight of sand.

In treating the sand, the silane solution or water was added directly to the sand at 25° C. in a Hobart Kitchen Aid Mixer and mixed for 1 minute.

The sand used in this example was obtained from foundry molds and cores that had been used in casting iron or steel. The sand was different from that used in Examples 1–4. In forming these molds and cores, the binder solution utilized comprised an ALpHASET 9000 potassium alkali phenol formaldehyde binder solution as described in Example 1. This binder solution had a Brookfield viscosity in the range of 100–150 cps, as determined utilizing a Model RVF Brookfield Viscometer with a No. 1 spindle at 20 r.p.m. at 25° C., at a solids content of 53% to 58%. This binder solution included about 0.4% by weight, based on the weight of said binder solution, of the silane, gamma-aminopropyltriethoxy silane, and it was cured with triacetin curing agent.

The foundry molds or cores were dismantled after use in a casting process by the shakeout of any loose sand and breaking up of lumps utilizing a dry attrition unit produced by Redford Carver Foundry Products, Sherwood, Oregon. Sand having an AFS screen distribution of 48.7 Grain Fineness and an LOI of 0.80 was obtained.

To prepare the test cores, from 1500–2500 gms of sand were added to a Hobart Kitchen Aid Mixer for each test and control. The sand was brought to a temperature of about 25° C., the silane solution was applied, and about 1.5% by weight of an aqueous solution of a potassium alkali phenol-formaldehyde resin, as used to make the test cores of Example 1 and as described in Example 1, was added and mixed for about 1 minute. The weight percent of resin solution was based on the weight of sand. Then, about 25% by weight triacetin, based on the weight of resin solution, was added and mixed for about 40 seconds.

After mixing, the sand was immediately used to form tensile briquettes by the methods described in Example 1. The cores were cured at room temperature and broken at intervals of 1 hr., 2 hr., 4 hr. and 24 hr., after the mix was made. Tensile measurements were made as reported in Example 1.

From 3 to 4 tensile strength measurements were obtained and averaged for each test and control. These average results are reported in Table 5 with the percent improvement in tensile strengths obtained.

Test cores were made from reclaimed sand as treated below.

Control-9—The reclaimed sand was untreated.

Test-I—The reclaimed sand at 25° C. was treated with 0.036 weight percent, based on the weight of sand, of a silane solution diluted with 0.084% by weight methanol, based on the weight of sand. The silane solution was a 50% ureidopropyl triethoxy silane solution in methanol.

Test-J—The reclaimed sand was treated at 25° C. with 0.036 weight percent, based on the weight of sand, of a silane solution diluted with 0.084% by weight water, based on the weight of sand. The silane solution was 50% ureidopropyl triethoxysilane in water.

Test-K—The reclaimed sand at 25° C. was treated with 0.036 weight percent, based on the weight of sand, of a 40% gamma-aminopropyl triethoxysilane solution in water, diluted with 0.084% by weight water, based on the weight of sand.

Test-L—The reclaimed sand at 25° C. was treated with 0.036 weight percent, based on the weight of sand, of gamma-glycidoxypropyl trimethoxysilane at 98% concentration, diluted with 0.084% by weight methanol, based on the weight of sand.

Test-M—The reclaimed sand at 25° C. was treated with 0.036 weight percent, based on the weight of sand, of a gamma-glycidoxypropyl trimethoxysilane at 98% concentration, diluted with 0.084 weight percent water, based on the weight of sand.

The sand used in this example was obtained from the same source and treated in the same way as the sand used in Example 5. The sand had the same particle screen distribution as the sand of Example 5 also.

To prepare the test cores, from 1500–2500 gms of reclaimed sand for each test and control were transferred to a Hobart mixer. The sand was brought to 25° C., the silane solution (if used) was applied as described above, and then the silane-treated sand was mixed with a binder solution and curing agent as described in Example 1. After mixing in the curing agent, 1-inch dogbone tensile briquettes were prepared and analyzed as described in Example 1. The average of 3–4 measured values of tensile strength for Tests I-M and Control-9 are reported below in Table 6.

TABLE 5

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-7 | — | — | 17 | 20 | 28 | 32 | — | — | — | — |
| Control-8 | — | 0.2 | 30 | 41 | 55 | 55 | 76% | 105% | 96% | 71% |
| Test-H | 0.12 | 0.2 | 40 | 46 | 55 | 60 | 135% | 130% | 96% | 87% |

The data in Table 5 show that an improvement in tensile strength can be obtained even with the simple addition of water. The data in Table 5 also show that the combination of water and silane, i.e., an aqueous solution of silane, provides better results than water alone.

EXAMPLE 6

The Effectiveness of Different Silane Solutions

This example demonstrates the effectiveness of different silanes in different solvents. More particularly, a ureidosilane, an aminosilane, and a glycidoxy silane were used in methanol and water to compare the improvement in tensile strengths of the test cores obtained.

The results in Table 6 indicate that improvements in tensile properties can be obtained from different types of silanes including gamma-glycidoxypropyltrimethoxysilane, gamma-aminopropyl triethoxy silane and gamma-ureidopropyl triethoxy silane. In addition, these examples also show that both organic and aqueous solutions of silane provide improved tensile strengths, with aqueous solutions being preferred.

EXAMPLE 7

Comparison of Pre-Treatment, Post-Treatment and Simultaneous Treatment of Reclaimed Sand with Silane Solutions In this example, the tensile strength of test cores obtained from sand that was treated with an aqueous silane solution prior to the addition of binder, subsequent to the addition of binder, and simultaneously with the addition of binder and curative agent, are compared for the purpose of demonstrating the independence of the timing of the treatment steps.

The reclaimed sand used in this example was as described in Example 5. The binder solutions and curing agents used in this example were as described in Example 1.

Test cores were made from reclaimed sand treated as follows.

Control-10—The reclaimed sand was untreated.

Tests N, O and P—The reclaimed sand at 25° C. was treated with 0.08% by weight, based on the weight of sand, of a 40% silane solution as described in Example 1, diluted with 0.12% by weight water, based on the weight of reclaimed sand.

For Test-M, from 1500–2500 gms of reclaimed sand were added to a Hobart Kitchen Aid Mixer and the sand was brought to a temperature of about 25° C. The silane solution was then added directly to the sand and mixed for about one minute. Then, 1.5% by weight resin binder solution, based on the weight of the sand, was added and mixed for one minute. Then, about 25% by weight of triacetin, based on the weight of binder solution, was added and mixed for another 40 seconds. After mixing, the sand was used immediately to form 1" dogbone tensile briquettes and tensile strength measurements were made as described in Example 1.

For Test N, from 1500–2500 gms of reclaimed sand were added to a Hobart Kitchen Aid Mixer and the sand was brought to a temperature of about 25° C., after which about 1.5 weight percent a binder solution, based on the weight of the sand, was added to the sand simultaneously with the silane solution and the contents mixed for one minute. Following this, about 25% by weight of triacetin, based on the weight of resin solution, was added and mixed 40 seconds. After mixing, the sand was used to prepare the 1-inch dogbone tensile briquettes and tensile strengths measurement were made as described in Example 1.

For Test 0, from 1500–2500 gms of reclaimed sand at 25° C. were first mixed with a curable binder solution in an amount of about 1.5% by weight, based on the weight of sand. After one minute of agitation, about 25% by weight triacetin, based on the weight of the resin binder solution, was added and mixed for another 40 seconds. Prior to preparing the test cores, a quantity of silane solution was added to this raw batch formulation and mixed for about 1 minute, following which 1-inch dogbone tensile briquettes were made and tensile strengths determined as described in Example 1.

The average values of 3–4 tensile measurements for the test cores of Tests N, O and P and Control-10 are reported in Table 7.

TABLE 7

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-10 | — | — | 23 | 35 | 35 | 28 | — | — | — | — |
| Test-N | 0.08% | 0.12% | 32 | 45 | 55 | 55 | 39% | 28% | 57% | 96% |
| Test-O | 0.08% | 0.12% | 38 | 55 | 60 | 60 | 65% | 57% | 71% | 114% |
| Test-P | 0.08% | 0.12% | 37 | 45 | 50 | 50 | 60% | 28% | 42% | 78% |

The data in Table 7 show that the method of treating sand with a silane solution is independent of the timing of such treatment.

EXAMPLE 8

Silane Solution Treatment with a Continuous Mixer

Example 8 demonstrates the effectiveness of a continuous mixer in improving the tensile strengths of foundry cores and molds obtained from reclaimed sands. The reclaimed sand used herein was as described in Example 5. Before use it was brought to 25° C.

In Controls 11 through 14 and Tests Q and R, a continuous mixer was used, calibrated to deliver 125 pounds per minute of sand from an overhead bin. The resin utilized was as described in Example 1 and was fed in through a port by a pump close to the inlet chute at a rate of about 1.5% by weight, based on the weight of sand introduced. Ester hardener, gamma-butyrolactone, was introduced at a rate of about 25% by weight,

TABLE 6

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-9 | — | — | 173 | 20 | 28 | 32 | — | — | — | — |
| Test-I | Ureidosilane 0.036% | Methanol 0.084% | 23 | 30 | 45 | 50 | 35% | 50% | 60% | 56% |
| Test-J | Ureidosilane 0.036% | Water 0.084% | 25 | 41 | 50 | 55 | 47% | 100% | 78% | 71% |
| Test-K | Amino Silane 0.036% | Water 0.084% | 30 | 40 | 60 | 55 | 76% | 100% | 114% | 71% |
| Test-L | Glycidoxy 0.036% | Methanol 0.084% | 22 | 30 | 33 | 35 | 29% | 50% | 17% | 9% |
| Test-M | Glycidoxy .036% | Water .084% | 35 | 45 | 55 | 67 | 105% | 125% | 96% | 109% | based on the weight of resin solution, by means of a pump through another port.

Where there is no silane treatment of the reclaimed sand, the resin and hardener were fed as described above and the sand was recovered from the discharge chute. The dogbone tensile briquettes were made from this sand, then tested as described in Example 1.

For Tests Q and R, a silane solution was metered by a third pump into the same port delivering the resin solution, to provide a 40% gamma-aminopropyl triethoxy silane solution in water in the amount indicated under the heading "silane", diluted with the amount of water indicated under the heading "water" in Table 8. In Control 13, water was metered through the third pump and introduced into the resin inlet port, to provide 0.2 wt % water, based on the weight of sand. In Control 14, concentrated gamma-aminopropyltriethoxy silane was metered through the third pump and introduced into the inlet port, to provide about 0.038% by weight silane, based on the weight of sand.

Upon recovering the sand discharged from the mixer in each test and control, 1" dogbone tensile briquettes were made and tested as described in Example 5.

Average values for the 3 to 4 tensile strength measurements made for each test and control are reported in Table 8.

pristine sand. A control sample was prepared using the same ratios of pristine sand to reclaimed sand, but was not treated with silane solution.

Test cores were prepared from reclaimed sand/pristine sand mixtures treated as follows.

Control 15—The sand mix was untreated.

Test S—The sand mix at 25° C. was pretreated with a 40% silane solution in an amount of about 0.068% by weight diluted with 0.132% by weight water, based on the weight of sand. The silane was gamma-aminopropyl triethoxysilane. This pretreatment comprised adding the sand mix to a Hobart Kitchen Aid Mixer at 25° C., followed by the silane solution and mixing the sand and silane solution for about one minute.

To prepare test cores for Control-15 and Test R, 1500-2500 gms of sand was brought to a temperature of about 25° C. in a Hobart Kitchen Aid Mixer, then the silane solution was applied (if used). Following any silane pretreatment, 1.5% by weight resin solution, based on the weight of sand, was added. The resin binder solution used was as described in Example 1. The sand and resin were mixed for about one minute. Then about 25% by weight triacetin, based on the weight of resin solution, was added and mixed for another 40 seconds.

After mixing, 1-inch dogbone tensile briquettes were

TABLE 8

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-11 | — | — | 31 | 32 | — | 45 | — | — | — | — |
| Control-12 | — | — | 29 | 36 | 42 | 43 | — | — | — | — |
| Control-13 | — | 0.2% | 33 | 40 | 48 | 50 | 13% | 11% | 14% | 16% |
| Control-14 | 0.038* | — | 74 | 84 | 87 | 96 | 155% | 133% | 107% | 123% |
| Test-Q | 0.066 | 0.134% | 68 | 77 | — | 120 | 119% | 161% | — | 172% |
| Test-R | 0.098 | 0.198% | 80 | 87 | — | 142 | 158% | 171% | — | 222% |

*98% concentration

The data in Table 8 show that treatment of reclaimed sand with aqueous silane solutions provides significantly higher tensile strengths in test cores than treatment with water, or no treatment with either water or a silane solution. It is noted that treatment with concentrated silane provides test cores with lower tensile strengths than those treated with an equivalent amount of silane in solution, even where a continuous mixer is utilized.

EXAMPLE 9

Sand Blends of Mechanically Reclaimed Sand and Pristine Sand

This example demonstrates the usefulness of this invention for blends of pristine sand and reclaimed sand. The new, pristine sand used was a washed and dried silica sand of 52 Grain Fineness, as determined by the methods described in American Foundrymen's Society "Mold and Core Test Handbook", pp. 4.2–4.5. The sand mix consisted of 80 parts by weight of reclaimed sand as described in Example 5 and 20 parts by weight of the made and the tensile strengths tested as reported in Example 1. The average tensile strength values of 3–4 measurements for each control and test are reported below in Table 9.

TABLE 9

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-15 | — | — | 25 | 38 | 45 | 59 | — | — | — | — |
| Test-S | 0.068% | 0.132% | 45 | 57 | 72 | 88 | 80% | 50% | 60% | 49% |

The data in Table 9 show that foundry molds and cores obtained from mixtures of reclaimed sand and new, pristine sand show improvements in tensile strength when treated by the processes of this invention.

EXAMPLE 10

Aqueous Silane Treatment with Vapor Cure Methods

Example 10 serves to illustrate that treatment of reclaimed sand with silane solutions, as provided by this invention, is useful when preparing foundry cores and molds by a vapor cure method.

Test cores were made with reclaimed sand pretreated as follows.

Control-16—The reclaimed sand was untreated.

Test-T—The reclaimed sand at 25° C. was pretreated with 0.2% of a silane solution diluted with 0.3% by weight water, based on the weight of sand. The silane solution was 40% gamma-aminopropyl triethoxysilane in water. The reclaimed sand at 25° C. was pretreated with the silane solution by mixing within a Hobart Kitchen Aid Mixer for about 1 minute.

The test cores for Control-16 and Test-T were prepared by providing 1500-2500 gms. of reclaimed sand in a Hobart Kitchen Aid Mixer. The reclaimed sand was as used in Example 5. Prior to silane pretreatment, the sand was brought to a temperature of about 25° C., and the silane solution, if used, was applied then about 1.5% by weight of the resin solution described in Example 1, based on the weight of sand, was added and mixed for two minutes. After mixing, the sand was blown with a Redford Carver Core Blower (a tradename of Dependable Foundry Equipment Company, Sherwood, Oregon), using 80 psig air pressure for about one-half second, into a three cavity corebox for producing the Standard American Foundrymen's Society's 1" dogbone tensile briquettes.

After blowing in the sand, the corebox was gassed for 5 seconds with methyl formate vapors generated in a Cerjet gas generator (a tradename of Dependable Foundry Equipment, Sherwood, Oregon). After gassing, the cores were ejected and then allowed to stand under ambient conditions.

The tensile strength measurements were made using a Dietert Universal Sand Strength Machine 400-1, fitted with a Tensile Core Strength Accessory 610-N as described in Example 1. Between 3 to 4 measurements of tensile strength were made for each test and control and the average values were determined. The average tensile strength values of 3-4 measurements for each control and test are given in Table 10 below.

TABLE 10

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-16 | — | — | 23 | 24 | 26 | 27 | — | — | — | — |
| Test-T | 0.2% | 0.3% | 32 | 33 | 39 | 47 | 39% | 37% | 50% | 74% |

The results in Table 10 show that the pretreatment of reclaimed sand with silane solutions results in tensile improvements in test cores made by a vapor cure method. Therefore, this invention can be applied in the processes described in U.S. Pat. No. 4,468,359.

EXAMPLE 11

Binder Solutions Without Silane

This example illustrates the effectiveness of this invention in improving the tensile strength of test cores obtained from resin binder solutions which do not contain silane.

The sand used in this example was the same as the reclaimed sand described in Example 5. The resin binder solution was a potassium alkali phenol formaldehyde resin having a Brookfield viscosity of 100 cps, as measured in Example 1, at a 53.4% by weight solids content, as determined by the method described in Example 1. The phenol:formaldehyde molar ratio for the resin was 1:1.7 and the KOH:phenol molar ratio for the resin was 0.83 to 1. The resin binder solution did not contain silane.

Test cores were prepared from reclaimed sand treated as follows.

Control-18—The reclaimed sand was untreated.

Test-U—The reclaimed sand at 25° C. was pretreated with a 40% silane solution in water in an amount of 0.1 weight percent, based on the weight of sand, diluted with 0.2 weight percent water, based on the weight of sand. The silane was gamma-aminopropyl triethoxysilane.

This pretreatment comprised adding the sand mix to a Hobart Kitchen Aid Mixer, bringing it to 25° C., adding the silane solution and mixing the sand and silane solution for about one minute.

The test cores were prepared and tested as in Example 1. The average value for 3-4 measurements of the tensile strength for the cores produced are reported in Table 11.

TABLE 11

| Test | Total Silane Solution % Based on Sand Wt. | | Tensiles (psi) Hrs: | | | | % Improvement In Tensile Strength Hrs: | | | |
|---|---|---|---|---|---|---|---|---|---|---|
| | Silane (wt %) | Water (wt %) | 1 | 2 | 4 | 24 | 1 | 2 | 4 | 24 |
| Control-17 | — | — | 15 | 20 | 25 | 45 | — | — | — | — |
| Test-U | 0.1% | 0.2% | 33 | 50 | 60 | 90 | 120% | 150% | 140% | 100% |

The data in Table 11 illustrates that improvements are obtained in tensile strength with the process of this invention where the resin binder solution does not contain silane.

It is contemplated the present invention can be used in forming sand aggregates for non-foundry applications either as molds or cores or some other shaped structure.

While the invention has been described in connection with specific embodiments thereof, it will be understood that it is capable of further modifications. This application is intended to cover any variations, uses or adaptions of the invention following, in general, the principles of this invention, and including such departures from the present disclosure as come within known and customary practice within the art to which the invention pertains.

What is claimed is:

1. A method for treating free-flowing granular sand that comprises
    at least some free-flowing granular foundry sand that has been previously used by forming it into a resin-bonded shape with a binder of an alkaline phenolic resin cured by an ester-functional curing agent, then separated from said shape into free-flowing granules, to improve the tensile strength of a cured resin-bonded shape made from said sand, as compared to the tensile strength that would be achieved in the absence of said treatment, said method comprising placing said sand in contact with a solution of an aminosilane, wherein (a) the solvent in said solution is selected from the group consisting of water-compatible organic solvents, aqueous-liquids, and mixtures thereof, (b) said aminosilane consisting of either:

(1) a silane conforming to the formula R'Si-(OR)$_3$, wherein R' is a $C_2$–$C_6$ alkylene group bonded to an amino, hydroxy-$C_1$–$C_6$ alkylamino, or amino-$C_1$–$C_6$ alkylamino group, and the groups R may be the same or different and are selected from $C_1$–$C_6$ alkyl and $C_1$–$C_6$ alkoxy-substituted $C_1$–$C_6$ alkyl groups; or (2) an aminoalkyl alkoxysilane of the formula

where each R may be H or lower alkyl, independently of the other;

n equals a whole number of from 2 to 5;

$R^1$ is an alkyl group of from 1 to 4 carbon atoms;

$R_2$ is an alkyl group of from 1 to 4 carbon atoms or phenyl, and x is 0 or 1; or (3) $R_2N-(CH_2)_m-NH-(CH_2)_nSi(OR^1)_{3-x}(R^2)_x$ where each R may be H or lower alkyl, independently of the other;

m is a whole number of from 2 to 3;

n is a whole number of from 2 to 4;

$R^1$ is an alkyl group of from 1 to 4 carbon atoms;

$R^2$ is an alkyl group of from 1 to 4 carbon atoms, and x is 0 or 1; and (c) the amount of said aminosilane solution used is sufficient to increase the tensile strength of shaped resin-bonded articles made from such silane-treated sand.

2. A method according to claim 1, wherein said sand is placed in contact with an aminosilane solution comprised of water and aminosilane, at an aminosilane concentration in the range of from 5% to 90% by weight, and wherein the amount of residual aminosilane solution on said aminosilane-treated sand is from 0.0025% to 0.9% by weight of said sand.

3. A method according to claim 1, wherein said curing agent having ester functionality is selected from the group consisting of lactones, organic carbonates, carboxylic acid esters, and mixtures thereof.

4. A method according to claim 3, wherein said curing agent having ester functionality comprises a low molecular weight carboxylic acid ester.

5. A method according to claim 1, wherein the surfaces of said previously used sand have thereon a water-removable residue from previous bonding with a binder of an ester-cured alkaline phenolic resin.

6. A method according to claim 1, wherein said aminosilane contacting step comprises applying to said sand mix an aminosilane solution comprising aminosilane and water and having an aminosilane concentration of from about 1% to about 90% by weight based on said solution, using an amount of said solution of from 0.05% to 1% by weight based on said sand mix.

7. A method according to claim 6, wherein said aminosilane solution is at an aminosilane concentration in the range of from about 10% to about 80% by weight of said solution.

8. A method according to claim 1, wherein said silane used is an aminosilane conforming to the general formula $H_2N(CH_2)_nSi(OR^1)_{3-x}(R^2)_x$, wherein n equals a whole number of from 2 to 5, $R^1$ is an alkyl group of from 1 to 4 carbon atoms, $R^2$ is an alkyl group of from 1 to 4 carbon atoms or phenyl, and x is 0 or 1.

9. A method according to claim 8, wherein the aminosilane solution comprises an aqueous solution of an aminosilane selected from the group consisting of gamma-aminopropyl triethoxy silane, gamma-aminopropyl trimethoxy silane, gamma-aminobutyl triethoxy silane, gamma-aminopentyl triethoxy silane, gamma-aminopropyl diethoxymethyl silane, gamma-aminopropyl diethoxy phenyl silane, delta-aminobutyl diethoxy phenyl silane, delta-aminobutyl diethoxymethyl silane and delta-aminobutyl diethoxyethyl silane.

10. A method according to claim 1, wherein said aminosilane used is a diaminosilane which conforms to the general formula $H_2N-(CH_2)_m-NH-(CH_2)_nSi(OR^1)_{3-x}R^2_x$, wherein n is a whole number of from 2, to 4, m is a whole number of from 2 to 3, $R^1$ is alkyl group of from 1 to 4 carbon atoms, $R^2$ is an alkyl group of from 1 to 4 carbon atoms and x is 0 or 1.

11. A method according to claim 1, wherein the aminosilane solution comprises an aqueous solution of a diaminosilane selected from the group consisting of N-(gamma-aminopropyl)-gamma-aminopropyltriethoxysilane, N-(gamma-aminopropyl)-gamma-aminopropyl trimethoxysilane, N-(beta-aminoethyl)-gamma-aminopropyl dimethoxymethylsilane, N-methyl-gamma-aminopropyl triethoxysilane, N-ethyl-gamma-aminopropyl trimethoxysilane, N-methyl-gamma-aminopropyl dimethoxymethysilane, N-(N-methyl-beta-aminoethyl)-gamma-aminopropyl dimethoxymethylsilane, and N-(gamma-aminopropyl)-N-methyl-gamma-aminopropyl dimethoxymethysilane.

12. A method according to claim 1, wherein prior to contact with said aminosilane solution, said previously used sand is formed into a mixture with pristine sand, the amount of said pristine sand being within the range of from about 1% to about 80% by weight of the total weight of said mixture.

13. A method for treating a free-flowing granular sand mixture of pristine sand and of granules of reclaimed sand to improve the tensile strength of an ester-cured alkaline phenolic resin-bonded shape produced therefrom over the tensile strength that would be achieved if said mixture were not so treated, said granules of said reclaimed sand having been previously used by forming into a resin-bonded shape with a binder of an alkaline phenolic resin cured by an ester-functional curing agent, then separated from said shape into free-flowing granules, said method comprising mixing reclaimed sand with pristine sand, the amount of said pristine sand being within the range of from about 1% to about 80% by weight based on the total weight of said mixture, then placing said mixture of granules of pristine sand and of reclaimed sand in contact with an aqueous aminosilane solution, wherein said aminosilane consisting of either:

(1) a silane conforming to the formula R'Si(OR)$_3$, wherein R' is a $C_2$-$C_6$ alkylene group bonded to an amino, hydroxy-$C_1$-$C_6$ alkylamino, or amino-$C_1$-$C_6$ alkylamino group, and the groups R may be the same or different and are selected from $C_1$-$C_6$ alkyl and $C_1$-$C_6$ alkoxy substituted $C_1$-$C_6$ alkyl groups; or (2) an aminoalkyl alkoxysilane of the formula:

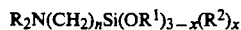

where
each R may be H or lower alkyl, independently of the other;
n equals a whole number of from 2 to 5;
$R^1$ is an alkyl group of from 1 to 4 carbon atoms;
$R^2$ is an alkyl group of from 1 to 4 carbon atoms or phenyl, and x is 0 or 1; or (3) $R_2N$—$(CH_2)_m$—NH—$(CH_2)_n$Si(OR$^1$)$_{3-x}$(R$^2$)$_x$ where
each R may be H or lower alkyl, independently of the other;
m is a whole number of from 2 to 3;
n is a whole number of from 2 to 4;
$R^1$ is an alkyl group of from 1 to 4 carbon atoms;
$R^2$ is an alkyl group of from 1 to 4 carbon atoms, and
x is 0 or 1; and
wherein the concentration and the amount of said solution are selected to be effective to improve the tensile strength of a resin-bonded shape produced from such mixture.

14. A method according to claim 13, wherein said curing agent having ester functionality is selected from the group including lactones, organic carbonates, carboxylic acid esters, and mixtures thereof.

15. A method according to claim 13, wherein said curing agent having ester functionality comprises a low molecular weight carboxylic acid ester.

16. A method according to claim 13, wherein said mixture of pristine sand and granules of reclaimed sand comprises from 10% to 50% by weight pristine sand based on the total weight of said mixture.

17. A method according to claim 13, wherein said mixture is placed in contact with said aminosilane solution by applying said solution at an aminosilane concentration of from about 10% to about 50% by weight based on said solution, using an amount of said solution of from about 0.05% to about 1.0% by weight based on said mixture.

18. A method according to claim 13, wherein said granules of reclaimed sand have thereon a water-removable residue from previous bonding with a binder of an ester-cured alkaline phenolic resin.

19. A method according to claim 13, wherein said sand mixture is placed in contact with said aminosilane solution at an aminosilane concentration in the range of from at least about 1% to about 90% by weight, based on the total weight of said aminosilane solution.

20. A previously used foundry sand that has been treated to make it useful in producing resin-bonded shapes such as molds, cores, and the like, of tensile strength sufficient for foundry use, comprising
free-flowing granular foundry sand comprising sand that has been previously used by forming it into a resin-bonded shape with a binder of an alkaline phenolic resin cured by an ester-functional curing agent, then separated from said shape into free-flowing granules for reuse,
and applied to said granules of previously used sand and wetting them, an aqueous solution of an aminosilane, said aminosilane consisting of either:

(1) a silane conforming to the formula R'Si(OR)$_3$, wherein R' is a $C_2$-$C_6$ alkylene group bonded to an amino, hydroxy-$C_1$-$C_6$ alkylamino, or amino-$C_1$-$C_6$ alkylamino group, and the groups R may be the same or different and are selected from $C_1$-$C_6$ alkyl and $C_1$-$C_6$ alkoxy-substituted $C_1$-$C_6$ alkyl groups; or (2) an aminoalkyl alkoxysilane of the formula:

where
each R may be H or lower alkyl, independently of the other;
n equals a whole number of from 2 to 5;
$R^1$ is an alkyl group of from 1 to 4 carbon atoms;
$R^2$ is an alkyl group of from 1 to 4 carbon atoms or phenyl, and
x is 0 or 1; or (3) $R_2N$—$(CH_2)_m$—NH—$(CH_2)$Si(OR$^1$)$_{3-x}$(R$^2$)$_x$ where
each R may be H or lower alkyl, independently of the other;
m is a whole number of from 2 to 3;
n is a whole number of from 2 to 4;
$R^1$ is an alkyl group of from 1 to 4 carbon atoms;
$R^2$ is an alkyl group of from 1 to 4 carbon atoms, and
x is 0 or 1; and
wherein the amount of said aminosilane and the aqueous vehicle in said solution are each chosen to be effective to improve the tensile strength of an ester-cured alkaline phenolic resin-bonded shape produced from said composition over the tensile strength that would otherwise be achieved if said sand were untreated,
the amount of said solution being sufficient to increase the tensile strength of shaped resin-bonded articles made from such silane-treated sand.

21. A composition comprising free-flowing granular foundry sand in accordance with claim 20, at least said free-flowing granules of previously used sand having applied thereto about 0.0025% to about 0.9% by weight of said aminosilane solution based on the weight of said free-flowing granules, said solution having a concentration of from about 5% to about 90% by weight of said aminosilane.

22. A composition comprising foundry sand according to claim 20, wherein said aminosilane comprises an aminosilane conforming to the general formula $H_2N(CH_2)_nSi(OR^1)_{3-x}(R^2)_x$ wherein n equals a whole number of from 2 to 5, $R^1$ is an alkyl group of from 1 to 4 carbon atoms, $R^2$ is an alkyl group of from 1 to 4 carbon atoms or phenyl, and x is 0 or 1.

23. A composition according to claim 22, wherein said aminosilane solution comprises an aqueous solution of an aminosilane selected from the group consisting of gamma-aminopropyl triethoxy silane, gamma-aminopropyl trimethoxy silane, gamma-aminobutyl triethoxy silane, gamma-aminopentyl triethoxy silane, gamma-aminopropyl diethoxymethyl silane, gamma-aminopropyl diethoxy phenyl silane, delta-aminobutyl diethoxy phenyl silane, delta-aminobutyl diethoxymethyl silane and delta-aminobutyl deithoxyethyl silane.

24. A composition according to claim 20, wherein said aminosilane comprises a diaminosilane which conforms to the general formula $H_2N$—$(CH_2)_m$—$NH$—$(CH_2)_n Si(OR^1)_{3-x} R^2_x$, wherein n is a whole number of from 2 to 4, m is a whole number of from 2 to 3, $R^1$ is alkyl group of from 1 to 4 carbon atoms, $R^2$ is an alkyl group of from 1 to 4 carbon atoms, and x is 0 or 1.

25. A composition according to claim 24, wherein said aminosilane solution comprises an aqueous solution of a diaminosilane selected from the group consisting of N-(gamma-aminopropyl)-gamma-aminopropyl triethoxysilane, N-(gamma-aminopropyl)-gamma-aminopropyl trimethoxysilane, N-beta-aminoethyl)-gamma-aminopropyl dimethoxymethylsilane, N-methyl-gamma-aminopropyl dimethoxymethylsilane, N-(N-methyl-beta-aminoethyl)-gamma-aminopropyl dimethoxysilane, and N-(gamma-aminopropyl)-N-methyl-gamma-aminopropyl dimethoxysilane.

26. A composition according to claim 20, wherein said sand further comprises pristine said admixed with said previously used sand.

27. A composition according to claim 26, wherein said pristine said comprises at least 20% by weight of said sand mixture and wherein said aminosilane comprises gamma-aminopropyl triethoxysilane.

28. A composition for use in making foundry molds, cores, and other shapes, comprising free-flowing granular foundry sand that has been previously used by forming it into a resin-bonded shape with a binder of an alkaline phenolic resin cured by an ester-functional curing agent, then reclaimed by being separated from said shape into free-flowing granules, after use in a metal casting process, said previously used, reclaimed sand having an American Foundrymen Society's screen distribution of 25 to 140 Grain Fineness, said reclaimed sand being wetted with an aqueous solution of an aminosilane wherein said aminosilane consists of:

(1) a silane conforming to the formula $R'Si(OR)_3$, wherein R' is a $C_2$–$C_6$ alkylene group bonded to an amino, hydroxy-$C_1$–$C_6$ alkylamino, or amino-$C_1$–$C_6$ alkylamino group, and the groups R may be the same or different and are selected from $C_1$–$C_6$ alkyl and $C_1$–$C_6$ alkoxy-substituted $C_1$–$C_6$ alkyl groups; or (2) an aminoalkyl alkoxysilane of the formula:

where
each R may be H or lower alkyl, independently of the other;
n equals a whole number of from 2 to 5;
$R^1$ is an alkyl group of from 1 to 4 carbon atoms;
$R^2$ is an alkyl group of from 1 to 4 carbon atoms or phenyl, and
x is 0 or 1; or (3) $R_2N$—$(CH_2)_m$—$NH$—$(CH_2)_n Si(OR^1)_{3-x}(R^2)_x$
where each R may be H or lower alkyl, independently of the other;
m is a whole number of from 2 to 3;
n is a whole number of from 2 to 4;
$R^1$ is an alkyl group of from 1 to 4 carbon atoms;
$R^2$ is an alkyl group of from 1 to 4 carbon atoms, and
x is 0 or 1; and
said solution having a concentration of from about 5% to about 90% by weight of said aminosilane, and
said sand granules having applied thereto from about 0.05% to about 1% by weight of said solution based on the weight of the sand,
wherein the amounts of said aminosilane and of the aqueous vehicle of said solution are each chosen to be effective to improve the tensile strength of an ester-cured, alkaline phenolic resin-bonded shape made from said treated sand, as compared to the tensile strength that would be achieved if said sand were untreated.

29. A composition according to claim 28, wherein said aminosilane conforms to the general formula $H_2N(CH_2)_n$—$Si(OR^1)_{3-x}(R^2)_x$, wherein n equals a whole number of from 2 to 5, $R^1$ is an alkyl group of from 1 to 4 carbon atoms, $R^2$ is an alkyl group of from 1 to 4 carbon atoms or phenyl, and x is 0 or 1.

30. A composition according to claim 29, wherein said aminosilane is selected from the group consisting of gamma-aminopropyl triethoxy silane, gamma-aminopropyl triethoxy silane, gamma-aminobutyl triethoxy silane, gamma-aminopentyl triethoxy silane, gamma-aminopropyl diethoxymethyl silane, gamma-aminopropyl diethoxy phenyl silane, delta-aminobutyl diethoxy phenyl silane, delta-aminobutyl diethoxymethyl silane and delta-aminobutyl diethoxyethyl silane.

31. A composition according to claim 28, wherein said aminosilane comprises a diaminosilane which conforms to the general formula $H_2N(CH_2)_n Si(OR^1)_{3-x}(R^2)_x$, wherein n is a whole number of from 2 to 4, m is a whole number of from 2 to 3, $R^1$ is an alkyl group of from 1 to 4 carbon atoms, $R^2$ is an alkyl group of from 1 to 4 carbon atoms or phenyl, and x is 0 or 1.

32. A composition according to claim 28, wherein said aminosilane comprises a diaminosilane selected from the group consistion of N-(gamma-aminopropyl)-gamma-aminopropyl triethoxysilane, N-(gamma-aminopropyl)-gamma-aminopropyl trimethoxysilane, N-(beta-aminoethyl)-gamma-aminopropyl dimethoxymethylsilane, N-methyl-gamma-aminopropyl triethoxysilane, N-ethyl-gamma-aminopropyl trimethoxysilane, N-methyl-gamma-aminopropyl dimethoxymethylsilane, N-(N-methyl-beta-aminoethyl)-gamma-aminopropyl dimethoxy-methysilane, and N-(gamma-aminopropyl)-N-methyl-gamma-aminopropyl dimethoxysilane.

33. A composition according to claim 28, wherein said sand further comprises pristine sand in admixture with said reclaimed sand.

34. A composition according to claim 33, wherein said pristine sand comprises at least 20% by weight of said admixture, and wherein said aminosilane comprises gamma-aminopropyl triethoxysilane.

* * * * *